United States Patent [19]

Geisthoff et al.

[11] Patent Number: 4,540,305

[45] Date of Patent: Sep. 10, 1985

[54] DRIVE SHAFT ASSEMBLY

[75] Inventors: Hubert Geisthoff; Jürgen Vollmer, both of Lohmar; Paul Herchenbach, Ruppichteroth, all of Fed. Rep. of Germany

[73] Assignee: Jean Walterscheid GmbH, Lohmar, Fed. Rep. of Germany

[21] Appl. No.: 572,575

[22] Filed: Jan. 20, 1984

[30] Foreign Application Priority Data

Jan. 29, 1983 [DE] Fed. Rep. of Germany ....... 3302976

[51] Int. Cl.³ .............................................. B25G 3/00
[52] U.S. Cl. ........................................ 403/13; 403/23; 403/359; 464/901
[58] Field of Search ................. 403/12, 13, 14, 23, 403/322, 359; 464/172, 162, 169, 901, 182

[56] References Cited

U.S. PATENT DOCUMENTS

| | | | |
|---|---|---|---|
| 2,910,842 | 11/1959 | Sensening | 464/182 |
| 2,990,205 | 6/1961 | Weisser | 403/359 X |
| 3,136,140 | 6/1964 | Atkinson | 464/172 |
| 3,542,178 | 11/1970 | Ripple | 464/901 X |
| 3,618,340 | 11/1971 | Geisthoff et al. | 464/172 X |
| 3,969,033 | 7/1976 | Recker | 403/322 |
| 3,990,550 | 11/1976 | Recker | 403/359 X |

FOREIGN PATENT DOCUMENTS 565060 10/1958 Canada .............................. 464/169
1231529 12/1966 Fed. Rep. of Germany ...... 403/359

Primary Examiner—Cornelius J. Husar
Assistant Examiner—Todd G. Williams
Attorney, Agent, or Firm—Toren, McGeady, Stanger, Goldberg & Kiel

[57] ABSTRACT

A drive shaft assembly including a pair of telescoping drive shaft parts one adapted to fit within the other having a tapered member on the one drive shaft part which extends outwardly therefrom and which is retractable against the force of a spring. An introducing funnel is provided on the other drive shaft part to guide insertion of the one drive shaft part and the two drive shaft parts are formed with a profile having a generally lemon-like shape with a pair of opposed radially extending beads. The one drive shaft part is formed within the areas between said beads with an axial cutout and a guide piece is provided on the other drive shaft part for guiding the one drive shaft part into engagement therewith, the guide piece having associated therewith an introducing inclination which is directed to extend opposite to the direction of rotation of the drive shaft assembly.

2 Claims, 4 Drawing Figures

DRIVE SHAFT ASSEMBLY

The present invention relates generally to a drive shaft assembly for automatically coupling and uncoupling the rotary drive between a tractor and an agricultural implement and more particularly to an assembly which consists of two telescopic drive shaft parts which are shaped with a profile and which are surrounded by a protective tubing which is also formed in two parts.

The invention further relates to an assembly wherein one drive shaft part is adapted to be inserted within the other with the one drive shaft part having at its inserting end a tapered member extending outwardly thereof, the inserting end of one part of the protective tube associated with the outer drive shaft part being provided with an introducing funnel. Furthermore, a free-wheeling unit is arranged at one end of the drive shaft assembly.

A drive shaft consisting of two drive shaft parts provided for automatic coupling is known from DE-GM No. 81 36 064. In the case of this device, one drive shaft part is provided with a coupling piece which is composed of tapered introducing parts. The other drive shaft part is provided with an introducing funnel.

The disadvantages of a drive shaft such as the type disclosed in the prior art is that the length of the introducing cone and the additional length of the coupling piece which is arranged to form the introducing part constitutes a part of the overall length of the assembly when joined together thereby increasing the overall telescopic length between the two drive shaft parts.

This is particularly disadvantageous if the drive shaft is to be used as a short attachment between a tractor and an agricultural implement where inadequate distance exists. In such a case, each unit of length of the telescopic member is important in order to ensure a sufficient degree of covering for the transmission of torque.

Accordingly, the present invention is directed toward providing a drive shaft assembly which will enable automatic coupling and which, as compared to conventional designs, minimizes the necessary telescopic length of the drive connection.

SUMMARY OF THE INVENTION

Briefly, the present invention may be described as a drive shaft assembly for automatically coupling and uncoupling a rotary drive connection between a tractor and an agricultural implement comprising: a pair of telescoping drive shaft parts each surrounded by a protective tube which is formed in two parts, one of said drive shaft parts being adapted to fit within the other of said drive shaft parts; each of said drive shaft parts being provided with a profile having a pair of opposed radially extending beads; a tapered member on said one drive shaft part extending outwardly therefrom; an introducing funnel on said other drive shaft part adapted to have said one drive shaft part inserted therethrough; a free-wheeling unit arranged at one end of said drive shaft assembly; spring means urging said tapered member outwardly of said one drive shaft part, said tapered member being adapted to be retracted against the force of said spring means; an axial cutout formed on said one drive shaft part within the area between said two beads; and a guide piece on said other drive shaft part for guiding said one drive shaft part into engagement therewith, said guide piece having associated therewith an introducing inclination which is directed to extend opposite to the direction of rotation of said drive shaft assembly.

Thus, in accordance with the invention, certain advantages are achieved in that the tapered member can be pushed or retracted into the inner drive shaft part against the force of the spring means, that within the areas between the two beads representing the profile the inner drive shaft part is provided with the axial cutout, and in that the introducing inclination associated with the guide piece of the outer drive shaft part is provided only in the direction opposite to the direction of rotation of the drive shaft assembly.

The advantages of the drive shaft assembly design in accordance with the invention is that, in the retracted condition, the tapered or introducing member is accommodated completely within the inner drive shaft part so that its length, which could be detrimental to the telescopic nature of the unit, does not occupy part of the length of the connected assembly.

As a result of the axial cutouts in the areas between the two beads of the inner drive shaft part, the bead areas assisting introduction are arranged in front of the effective length of the inner drive shaft part so that their conical design also helps to prevent any loss in telescopic length.

In accordance with a further feature of the invention, the introducing funnel on the outer drive shaft part is spring-biased toward the inserting end by the force of a second spring means. This measure ensures that the introducing funnel may be sufficiently large so as to serve as a guiding or introducing aid for the introduction of the tapered member or point during the coupling process without affecting the distance of insertion.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
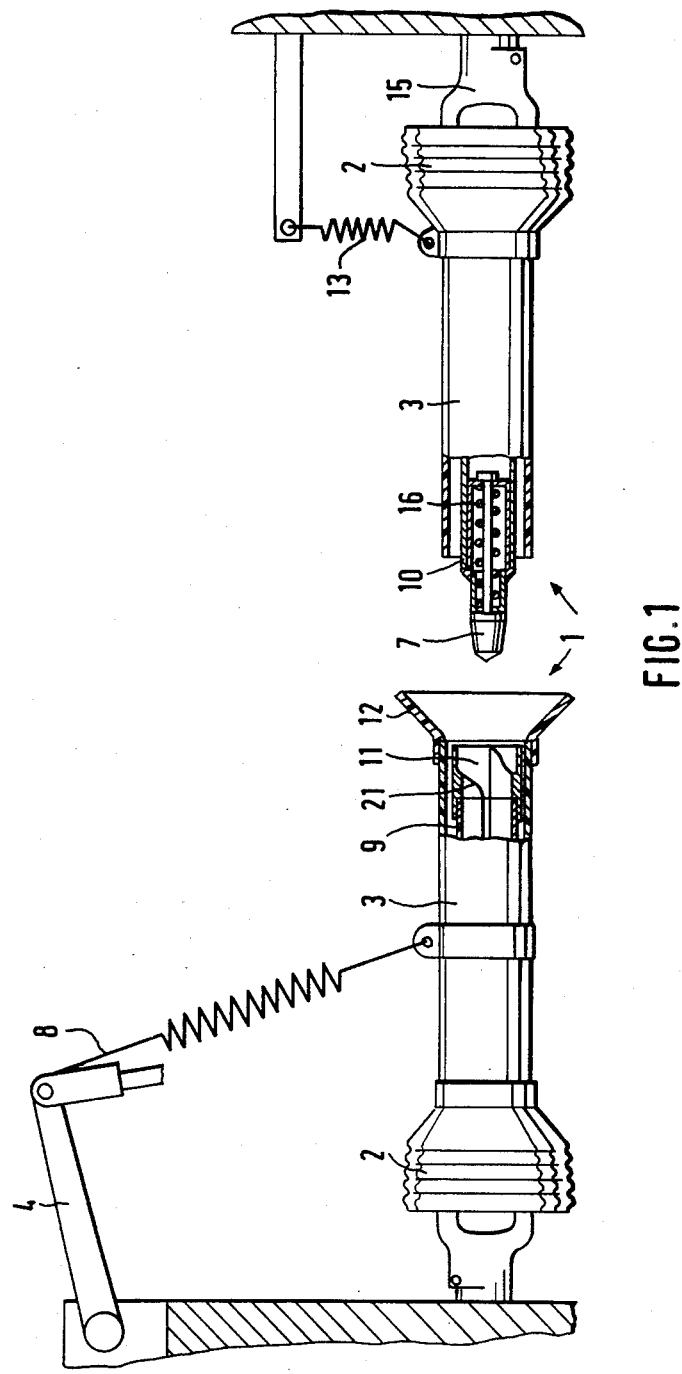
FIG. 1 is a view partially in section showing the drive shaft assembly in the extended, disconnected condition.

Referring now to the drawings, and particularly to FIG. 1, there is illustrated a drive shaft assembly 1 which is shown in an extended, disconnected condition and which consists of an outer drive shaft part 9 which, in the depicted embodiment, is connected to the power take-off shaft of a tractor. The assembly 1 also includes an inner drive shaft part 10 which is held by a spring 13 and connected by means of a yoke 15 to the power take-off shaft of an agricultural implement. The outer drive shaft part 9 is connected to a hydraulically pivotable lifting arm 4 of the tractor by a spring 8 attached to a protective tube 3 associated with the outer drive shaft part 9 which can therefore be aligned to the height of the inner shaft part 10.

In the inner drive shaft part 10, at the end thereof to be coupled, there is provided a tapered member or introducing point 7 which is spring-loaded to be biased outwardly of the drive shaft part 10 by a spring 16 and which is held so as to protrude from the shaft part 10. The outer drive shaft part 9 at its end to be coupled is provided with an introducing funnel 12 which is associated with the protective tube 3 and which, during the coupling process, ensures initial alignment of the member 7 with respect to the outer drive shaft part 9.

The shaft part 9 is formed with a profile or shape which is generally of a lemon-shaped configuration 22 and which includes beads 23. At the inserting end of the shaft part 9, there is provided a guide piece 11 in the case of which the profile of the outer drive shaft part 9 passes into an introducing inclination 21 provided at one end and extending in the direction opposite to the direction of rotation.

Provision of the introducing inclination 21 at one end ensures that in the torque transmitting direction only the guide piece 11 will also participate in the transmission of torque along its entire length.

Accurate alignment of the inner drive shaft part 10 relative to the outer drive shaft part 9 is effected by the cooperation of the tapered member or introducing point 7 and the guide piece 11. The correct angular alignment of the inner drive shaft part 10 relative to the outer drive shaft part 9 may be effected either by means of a free-wheeling unit provided in the tractor transmission or by a free-wheeling unit 20 arranged additionally at the end of the drive shaft assembly 1.

Figure 2:
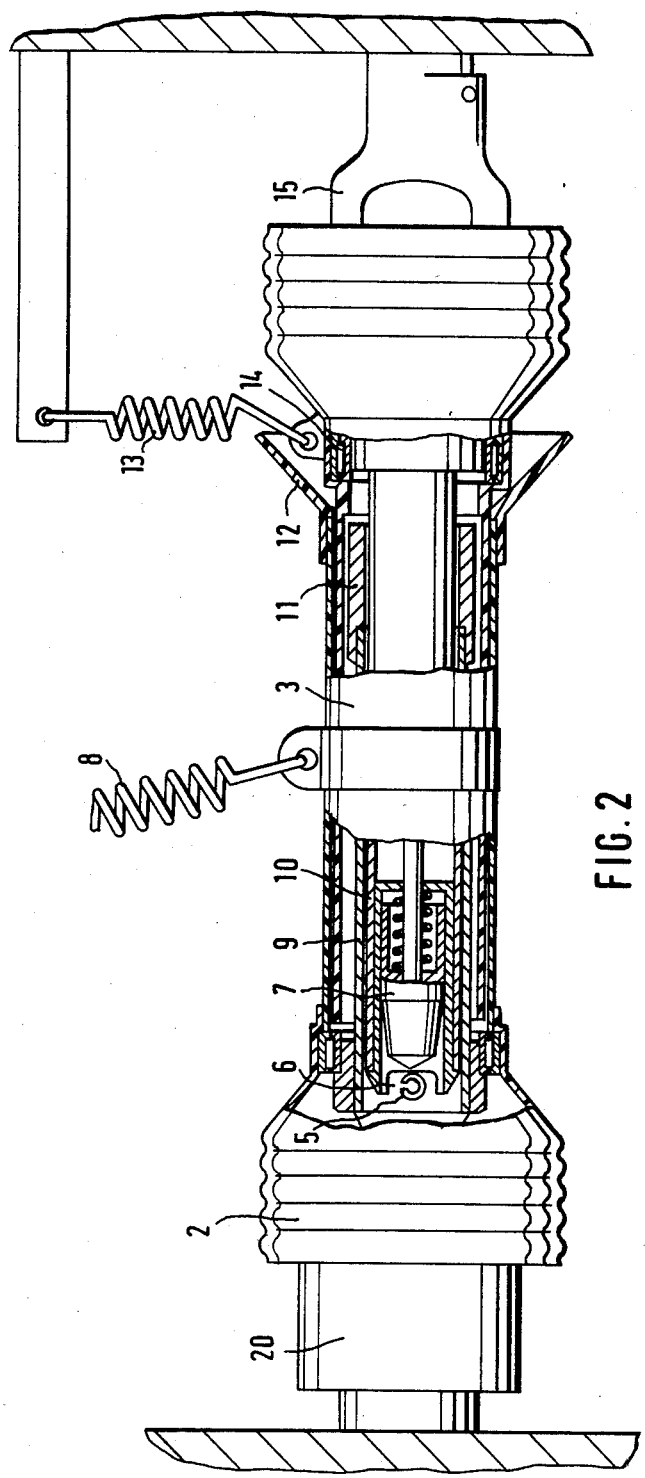
FIG. 2 is a partially sectioned view illustrating the drive shaft assembly in the coupled condition.

FIG. 2 shows the drive shaft assembly 1 in the completely coupled condition with the inner drive shaft part 10 inserted completely into the outer drive shaft part 9. At the inner end of the outer drive shaft part 9 provision is made for a stop pin 5 which simultaneously connects the outer drive shaft part 9 to the joint associated therewith. When the inner drive shaft part 10 is inserted into the outer drive shaft part 9, the tapered member 7 abuts the stop pin 5 and is completely inserted or retracted into the inner drive shaft part 10. This ensures that there will be no length detrimental to the telescopic distance of the drive shaft assembly, as is the case with conventional designs and caused by the member 7.

In the areas between the beads 23 forming part of the profile, the inner tube profile is provided with an axial cutout 6 so that an inclined introducing area of the inner profile tube associated with the beads 23 may project beyond the stop pin 5 and therefore will not act to create detrimental length.

Figure 3:
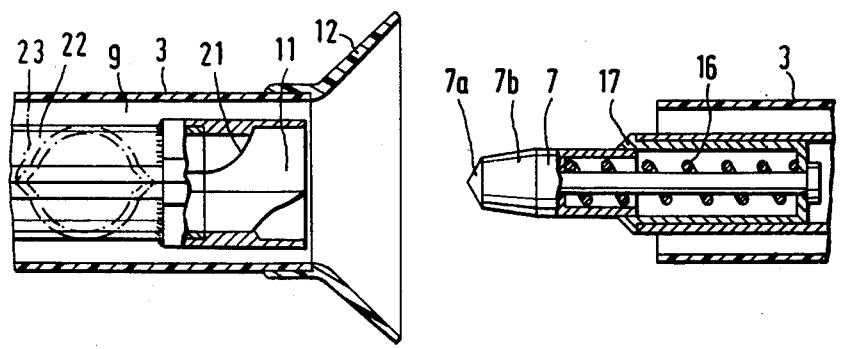
FIG. 3 is a sectional view showing the end pieces of the drive shaft parts which cooperate during coupling of the drive shaft assembly.

FIG. 3 illustrates the drive shaft assembly components and their cooperation when the drive shaft parts 9 and 10 are moved together. At the end extending outwardly, the member 7 is provided with a pointed conical tip 7a and with an adjacent truncated cone 7b. The diameter of the truncated cone 7b is such that the member 7 when introduced into the outer drive shaft part 9 cannot penetrate or become lodged into the annular gap or space between the protective tube 3 and the outer drive shaft part 9.

Figure 4:
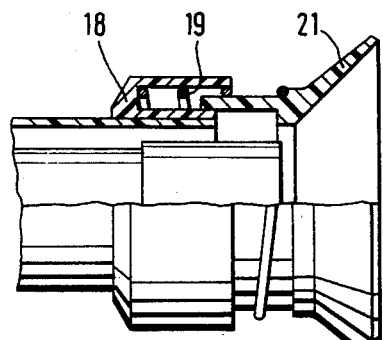
FIG. 4 is a partially sectioned view illustrating an axially movable introducing funnel.

FIG. 4 illustrates a further embodiment of the invention wherein the introducing funnel 12 is spring-biased outwardly by a spring 19, the other end of which is supported on a collar 18. Consequently, when the drive shaft assembly is telescoped completely, the introducing funnel may retract or give way if it touches an external component.

Thus, it will be seen that, in accordance with the present invention, there is provided an automatically coupling shaft assembly in the case of which, contrary to conventional designs, no telescoping length or coverage length is lost.

In accordance with the invention, the objective is achieved in that a tapered member provided on one drive shaft part and initiating the coupling process can be pushed or retracted into the inner drive shaft part against the force of a spring. An introducing inclination associated with the guide piece of the outer drive shaft part is provided with its direction of inclination being only in the direction opposite to the direction of rotation and the inner drive shaft part is designed with a "lemon-shaped" profile with the areas between the two beads of the profile having been provided with an axial cutout.

Retaining the greatest possible telescoping length or a high degree of covering is particularly important when short attaching devices for connecting an agricultural implement behind a tractor are used because, in such cases, only relatively short drive shafts are suitable so that the telescopic length or degree of covering must be fully utilized.

While specific embodiments of the invention have been shown and described in detail to illustrate the application of the inventive principles, it will be understood that the invention may be embodied otherwise departing from such principles.

What is claimed is:

1. A drive shaft assembly for automatically coupling and uncoupling a rotary drive connection between a tractor and an agricultural implement comprising:

a pair of telescoping drive shaft parts each surrounded by a protective tube which is formed in two parts, one of said drive shaft parts being adapted to fit within the other, each of said drive shaft parts being provided with a profile having a pair of opposed radially extending beads;

a tapered member on said one drive shaft part extending outwardly therefrom;

an introducing funnel on said other drive shaft part adapted to have said one drive shaft part inserted therethrough;

a free-wheeling unit arranged at one end of said drive shaft assembly;

spring means urging said tapered member outwardly of said one drive shaft part, said tapered member being adapted to be retracted against the force of said spring means;

an axial cutout formed on said one drive shaft part within the areas between said two beads; and a guide piece on said other drive shaft part for guiding said one drive shaft part into engagement therewith, said guide piece having associated therewith an introducing inclination which is directed to extend opposite to the direction of rotation of said drive shaft assembly.

2. A drive shaft assembly according to claim 1, further comprising second spring means spring-biasing said introducing funnel on said other drive shaft part outwardly thereof toward its inserting end, said introducing funnel being adapted to be retracted against the force of said spring.

* * * * *